United States Patent [19]

Tse

[11] Patent Number: 4,811,313

[45] Date of Patent: Mar. 7, 1989

[54] LOUDSPEAKER AND AUDIO REPRODUCTION APPARATUS

[75] Inventor: Siu-Kwong Tse, Hong Kong, Hong Kong

[73] Assignee: Skitronic Limited of Cheung Ka Industrial Bldg., Hong Kong

[21] Appl. No.: 27,213

[22] Filed: Mar. 17, 1987

[30] Foreign Application Priority Data

Mar. 10, 1987 [GB] United Kingdom ................. 8705627

[51] Int. Cl.$^4$ ........................... H04R 1/00; H04B 1/20

[52] U.S. Cl. ....................................... 369/6; 84/464 R

[58] Field of Search .................... 318/90, 111, 150, 56; 84/464; 381/124; 362/253

[56] References Cited

U.S. PATENT DOCUMENTS

| | | | |
|---|---|---|---|
| 1,790,903 | 2/1931 | Craig | 84/464 |
| 2,501,968 | 3/1950 | Sassin | 362/253 |

FOREIGN PATENT DOCUMENTS

| | | | |
|---|---|---|---|
| 59-126398 | 7/1984 | Japan | 381/124 |
| 257341 | 8/1926 | United Kingdom . | |
| 305542 | 2/1929 | United Kingdom . | |
| 411112 | 5/1934 | United Kingdom . | |
| 515569 | 12/1939 | United Kingdom . | |
| 666204 | 2/1952 | United Kingdom . | |
| 1248821 | 10/1971 | United Kingdom | 84/464 |
| 2155797 | 10/1985 | United Kingdom | 84/464 |

*Primary Examiner*—Alan Faber
*Assistant Examiner*—James E. Tomassini
*Attorney, Agent, or Firm*—Lowe, Price, Leblanc, Becker & Shur

[57] ABSTRACT

A loudspeaker has a pot-shaped permanent magnet having an aperture in its axial pole. A light source in a translucent colored plastic plug is housed in the aperture. The light source is driven in accordance with the frequency and strength of the signal fed to the speaker. A translucent colored membrane or filter is glued to the speaker cone.

13 Claims, 2 Drawing Sheets

LOUDSPEAKER AND AUDIO REPRODUCTION APPARATUS

The present invention relates to a loudspeaker and to audio reproduction apparatus, and more particularly to the provision of lights in such apparatus which are driven in accordance with the strength and/or frequency of the reproduced sound.

A first aspect of the invention provides a loudspeaker comprising a cone, the cone being vibrated to produce a sound, and a light source within the outer periphery of the cone when seen in plan view.

A second aspect of the invention provides an audio reproducing apparatus comprising an array of light emitting diodes, wherein the degree of illumination of the light emitting diodes is controlled in accordance with the frequency and/or signal strength of the audio signal reproduced by the reproducing apparatus.

Other preferred features and advantages of the invention will be apparent from the following description and the accompanying claims.

Figure 1:
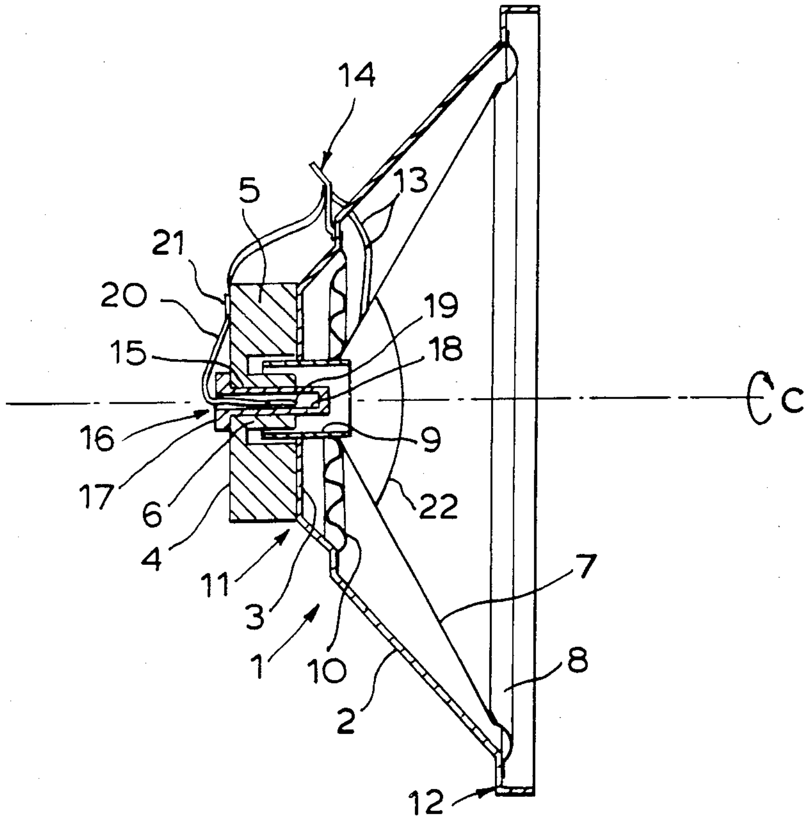
Figure 2:
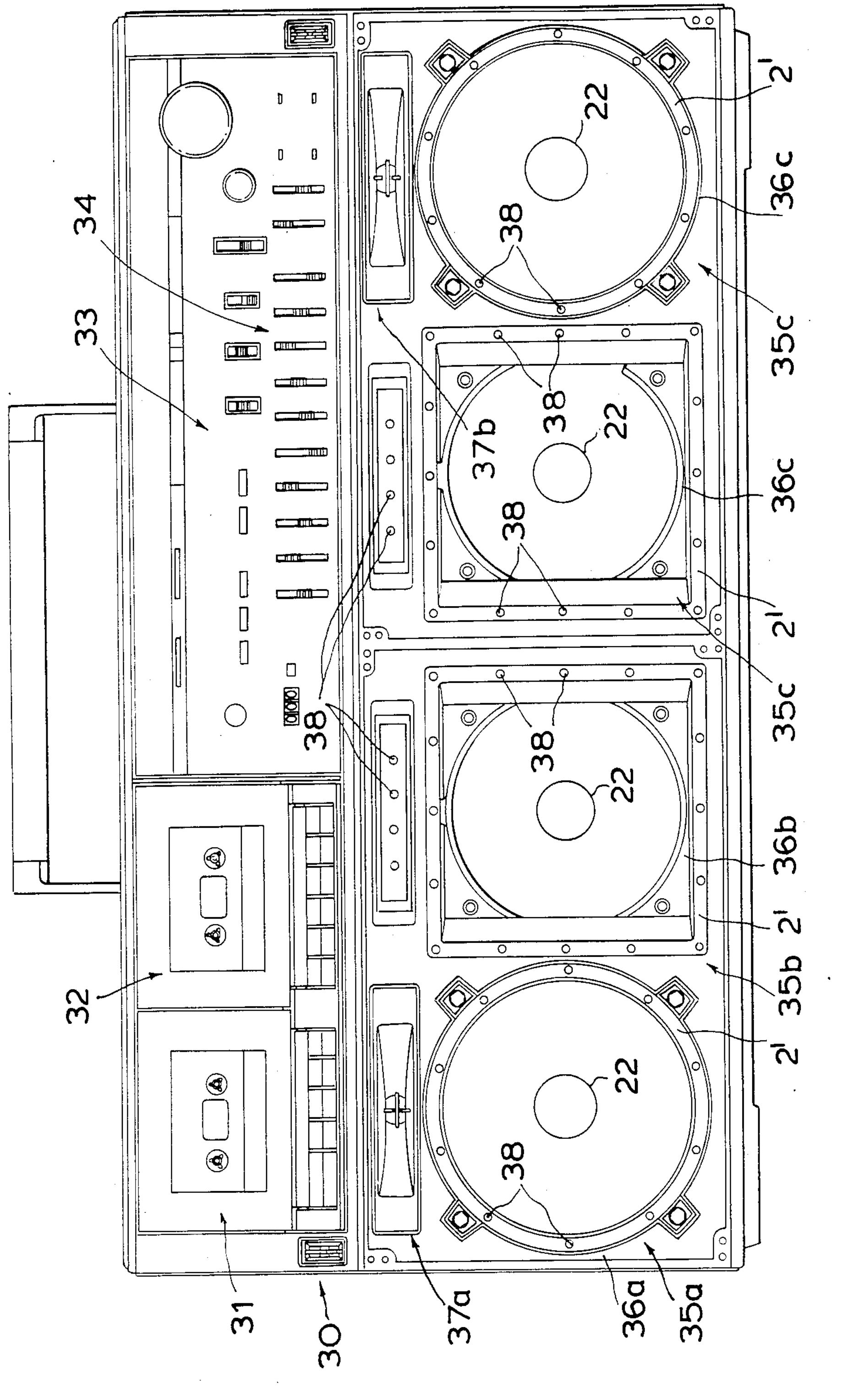

The invention will be further described by way of example with reference to the accompanying drawings in which:

FIG. 1 is a cross-section through a loudspeaker according to the invention; and FIG. 2 is a front view of an audio reproducing apparatus according to the invention.

In the drawings, FIG. 1 is a cross-sectional view through a loudspeaker according to the invention. The loudspeaker 1 comprises a generally conical pressed steel frame 2 having an annular base 3 at its inner end 1. A pot-shaped permanent magnet 4 is mounted on the base 3 and comprises an annular outer pole 5, for example the North pole, and a inner cylindrical pole 6, for example the South pole. A paper cone 7 is mounted at its outer, larger end 12 on rubber ring 8, by gluing. Ring 8 is attached to the outer, larger end of the frame 2 by gluing.

The inner, smaller end of cone 7 is glued to a cylinder 9 of metal foil. Also glued to cylinder 9 is a corrugated fabric diaphragm 10 which is glued to the frame 2 on a ledge between its inner and outer ends 11, 12. Cylinder 9 is received in the annular space formed between the poles 5, 6 of magnet 4. An electrical coil is wound on the outside of the cylinder 9 in the region between the poles 5, 6. Leads 13 from the coil pass along the outside of the cylinder 9 and are fed to respective tags indicated generally by reference numeral 14 for connection to a signal source. The construction thus far described is well known in the art as is the mode of operation of the speaker and need not be described in more detail here.

The improvement provided by the invention is a light source within the boundary of the outer end of the cone 7, when seen in plan, from the right in FIG. 1.

More particularly, a bore 15 is formed through the pot-shaped magnet 4 along its central axis C. A coloured, translucent plastics plug 16 is a close fit in the bore 15. Plug 16 has a flanged end 17 and an axial blind bore 18. The plug 16 is fixed firmly in the bore 15 by gluing the flanged end 17 to the magnet 4.

A miniature light bulb 19 is housed loosely in the bore 18. Wires 20 from the bulb are fed out of the fore from respective tags 14 different to the tags for speaker leads 13. The wires 20 are attached to the magnet 4 by adhesive tape 21, serving to hold the bulb 19 loosely in the bore 18.

A part spherical translucent diaphragm or filter 22 is glued to the cone 7 to mask the inner workings of the speaker and provide a further diffusing filter for light from the bulb 19.

In use the speaker is driven in the usual way, the driving signal being fed to the leads 13. A power supply is connected to the leads 20 for illuminating the bulb 19. The power may be controlled to vary with the frequency and/or strength of the signal fed to the speaker through leads 13. Suitable control systems are well known in the art and need not be described here.

FIG. 2 is a front view of an audio reproducing apparatus according to the invention.

The apparatus 30 is a portable audio tape reproducing apparatus and radio receiver, having audio tape record and playback functions 31, 32, a tuner 33 and a graphic equalizer 34.

The unit has four speaker units 35*a, b, c, d* each comprising a mid to low range speaker 36 having the configuration of the speaker described with reference to FIG. 1, and two high frequency speakers 37*a*, 37*b*.

Arrays of light emitting diodes (LED's) 38 are arranged around the periphery of the cones of the speakers 36, and above the central speakers.

The LED's are mounted on the frames 2 of the speakers (cf frame 2 of FIG. 1).

In a preferred embodiment LED's of a variety of colours are used. Preferably the central light of each speaker 36 is of different colour, for example blue, yellow, red and green.

The LED's and the central speaker lights are powered from a supply which is regulated in accordance with the frequency and strength of the audio signal. Different arrays or LED's may be arranged to be driven in response to different frequency bands. Again, suitable control systems are well known in the art.

I claim:

1. A loudspeaker comprising a frame and a magnetic circuit including magnet and coil elements, one of the elements of the magnetic circuit being attached to the frame, said one element having front and rear sides and a through bore extending between the front and rear sides, a vibratory sound producing cone having a base and an apex, the base being mounted on the frame, the other element of the magnetic circuit mounted at the apex in proximity to a front side of said one element of the magnetic circuit, a translucent diaphragm permanently attached on an inside surface of the cone between the cone apex and base to cover the cone apex when viewed from the base end, and a light source mounted behind the diaphragm when viewed from the cone base end so the light source illuminates the diaphragm, said one element processing means to enable said light source to be inserted into and removed from said bore from the rear side of said one element.

2. The loudspeaker of claim 1, further including means for varying the brightness of light emitted from the source in response to the frequency and/or volume of a signal applied to the loudspeaker coil element.

3. The loudspeaker of claim 1, wherein the light source is mounted on or near the cone axis.

4. The loudspeaker of claim 1, wherein the translucent diaphragm is a colored filter.

5. The loudspeaker of claim 4, wherein the light source is housed in a translucent colored casing.

6. The loudspeaker of claim 5, wherein the translucent coloured casing comprises a tubular portion having a snug fit in the bore and closed at a first end proximal the front side of the first element, the casing having a peripheral flange portion at a second end opposite said first end, said flange portion bearing against the rear side of the first element.

7. A portable reproducing apparatus including a loudspeaker comprising a frame, a cone having an apex and a base, the cone being mounted at the base of the frame for movement relative to the frame, a coil mounted on the apex of the cone, a permanent magnet mounted on the frame coaxially with the coil, the magnet having a front side facing towards the cone and a through bore connecting the front and rear sides, a translucent diaphragm attached to an inner surface of the cone to cover the apex when viewed from the base, and a light source mounted in the bore of the permanent magnet, the permanent magnet being including means to enable constructed the light source to be removed from and inserted into the bore from the rear side of the magnet.

8. The apparatus of claim 7, comprising at least two of said loudspeakers, wherein at least two of the loudspeakers is provided with light sources of different color.

9. The apparatus of claim 8, further comprising an array of light emitting diodes, and means for controlling the degree of illumination of the light source and the light emitting diodes in response to the frequency and-/or signal strength of an audio signal coupled to the coil.

10. The apparatus of claim 8, further comprising plural light emitting diodes of different colors positioned to be viewed with the diaphragm.

11. The apparatus of claim 10, wherein the light emitting diodes are arranged around the periphery of the cone of said loudspeaker of the apparatus.

12. The apparatus of claim 9, wherein different light emitting diodes of the array are controlled in response to different frequency ranges and/or signal strengths.

13. The apparatus of claim 8, further comprising at least one of an audio tape reproducing apparatus and/or a radio receiver for supplying a signal to the coil.

* * * * *